United States Patent
Zhang et al.

(10) Patent No.: US 12,147,639 B2
(45) Date of Patent: Nov. 19, 2024

(54) TOUCH SUBSTRATE AND DISPLAY PANEL

(71) Applicant: WUHAN CHINA STAR OPTOELECTRONICS SEMICONDUCTOR DISPLAY TECHNOLOGY CO., LTD., Hubei (CN)

(72) Inventors: Zhen Zhang, Hubei (CN); Jian Ye, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/759,373

(22) PCT Filed: Jun. 27, 2022

(86) PCT No.: PCT/CN2022/101677
§ 371 (c)(1),
(2) Date: Jul. 24, 2022

(87) PCT Pub. No.: WO2023/236275
PCT Pub. Date: Dec. 14, 2023

(65) Prior Publication Data
US 2024/0192820 A1 Jun. 13, 2024

(30) Foreign Application Priority Data
Jun. 9, 2022 (CN) .......................... 202210650969.8

(51) Int. Cl.
*G06F 3/044* (2006.01)

(52) U.S. Cl.
CPC .......... *G06F 3/0448* (2019.05); *G06F 3/0446* (2019.05); *G06F 2203/04111* (2013.01); *G06F 2203/04112* (2013.01)

(58) Field of Classification Search
CPC ................. G06F 3/0448; G06F 3/0446; G06F 2203/04112
See application file for complete search history.

(56) References Cited

U.S. PATENT DOCUMENTS

| 2012/0081333 A1* | 4/2012 | Ozeki | .................. G06F 3/0446 345/174 |
|---|---|---|---|
| 2016/0124543 A1 | 5/2016 | Chu | |

(Continued)

FOREIGN PATENT DOCUMENTS

| CN | 111651092 A | 9/2020 |
|---|---|---|
| CN | 111651093 A | 9/2020 |

(Continued)

OTHER PUBLICATIONS

International Search Report in International application No. PCT/CN2022/101677, mailed on Dec. 21, 2022.

(Continued)

*Primary Examiner* — Kevin M Nguyen
(74) *Attorney, Agent, or Firm* — PV IP PC; Wei Te Chung

(57) ABSTRACT

A touch substrate and a display panel are provided. The touch substrate includes a plurality of touch units. Each of the touch units includes a first electrode and a second electrode disposed electrically insulated from each other. The first electrode includes a first main branch electrode extending along a first direction, and at least one first branch pattern and at least one third branch pattern respectively disposed on two sides of the first main branch electrode. The second electrode includes a second main branch electrode extending along a second direction perpendicular to the first (Continued)

direction, and at least one second branch pattern and at least one fourth branch pattern respectively disposed on two sides of the second main branch electrode.

20 Claims, 7 Drawing Sheets

(56) References Cited

U.S. PATENT DOCUMENTS

| | | | |
|---|---|---|---|
| 2017/0160830 A1 | 6/2017 | Lee | |
| 2019/0004629 A1* | 1/2019 | Brunet | G06F 3/0446 |
| 2019/0129538 A1* | 5/2019 | Yoshida | G06F 3/0412 |
| 2023/0128593 A1* | 4/2023 | Ye | G06F 3/0448 |
| | | | 345/173 |

FOREIGN PATENT DOCUMENTS

| | | |
|---|---|---|
| CN | 111736736 A | 10/2020 |
| CN | 113741728 A | 12/2021 |

OTHER PUBLICATIONS

Written Opinion of the International Search Authority in International application No. PCT/CN2022/101677, mailed on Dec. 21, 2022.

* cited by examiner

TOUCH SUBSTRATE AND DISPLAY PANEL

BACKGROUND OF INVENTION

Field of Invention

The present application relates to the field of display devices, and particularly relates to a touch substrate and a display panel.

Description of Prior Art

Capacitive touch screens are widely used in various devices of electronic interactive scenes due to their high durability, long service lives, and support for multi-touch functions. The capacitive touch screens detect specific positions of finger touch by detecting capacitance change at the positions touched by the fingers. Therefore, when the change amount of capacitance incurred by the touch is small, conventional capacitive touch screens may not be able to accurately detect whether there is a touch inputted. Because structural designs of the touch screens are a very important factor for detecting the change amount of the capacitance, it is necessary to develop a design solution for a touch screen that can detect the small change amount of the capacitance.

Currently, regarding flexible active-matrix organic light-emitting diode (AMOLED) displays, touch electrode patterns usually need to be directly manufactured on upper surfaces of thin-film encapsulation layers. However, due to the thin encapsulation layers are thin (which thickness is usually about 10 μm), a distance between touch electrodes and cathodes is small, resulting in large parasitic capacitance between driving electrodes (transmitters, TXs)/sensing electrodes (receivers, RXs) and the cathodes, which in turn leads to a large resistor-capacitor (RC) delay, reducing touch sensitivity. Furthermore, a material of the touch electrode in the current flexible AMOLED displays is usually a hollow metal mesh material, which actual effective conductive electrode area is smaller than that of a traditional full-surface transparent ITO material. Therefore, mutual capacitance inductance between the touch electrodes of TXs and RXs is very small, resulting in smaller capacitance change when a finger touches, which is not easy to be detected by touch chips.

SUMMARY OF INVENTION

One purpose of the present invention is to provide a touch substrate and a display panel to solve the problem of reduction of sensitivity and accuracy of the touch substrate incurred by the parasitic capacitance between the touch electrodes and the cathodes being relatively large in the prior art.

In order to realize the aforesaid purpose, the present invention provides a touch substrate. The touch substrate includes a plurality of touch units. Each of the touch units includes a first electrode and a second electrode disposed electrically insulated from each other.

The first electrode includes a first main branch electrode extending along a first direction and at least one first branch pattern and at least one third branch pattern respectively disposed on two sides of the first main branch electrode. The second electrode includes a second main branch electrode extending along a second direction perpendicular to the first direction and at least one second branch pattern and at least one fourth branch pattern respectively disposed on two sides of the second main branch electrode.

In the second direction, with a first connection center acting as a central point, and the first branch pattern diffuses toward two sides of the first connection center; and with a second connection center acting as a central point, and the second branch pattern diffuses toward two sides of the second connection center. In the first direction, with the second connection center acting as the central point, the third branch pattern diffuses toward two sides of the second connection center and encloses the second branch pattern; and with the first connection center acting as the central point, the fourth branch pattern diffuses toward two sides of the first connection center and encloses the first branch pattern.

Furthermore, an area of the first electrode is equal to an area of the second electrode in one of the touch units.

Furthermore, the first electrode further includes a first secondary branch electrode and a first branch electrode. The first secondary branch electrode is parallel to the second main branch electrode and is electrically connected to the first main branch electrode. The first branch electrode is disposed on a side of the first main branch electrode and the first secondary branch electrode.

The second electrode further includes a second secondary branch electrode and a second branch electrode. The second secondary branch electrode is parallel to the first main branch electrode and is electrically connected to the second main branch electrode. The second branch electrode is disposed on a side of the second main branch electrode and the second secondary branch electrode.

The touch unit is a centrosymmetric structure and has a symmetrical center. With the symmetrical center acting as a central point, and the first main branch electrode, the first secondary branch electrode, and the first branch electrode form a pinwheel-shaped structure. The symmetrical center acts as a central point, the second main branch electrode, the second secondary branch electrode, and the second branch electrode form a pinwheel-shaped structure. A direction the pinwheel-shaped structure in the first electrode is opposite to a direction of the pinwheel-shaped structure in the second electrode.

Furthermore, the second secondary branch electrode is disposed on a side of the first main branch electrode away from the first connection center, and the first secondary branch electrode is disposed on a side of the second main branch electrode close to the second connection center.

Furthermore, the touch units have a first region, a second region, a third region, and a fourth region arranged in an array manner. In the first direction, the first region is connected to the fourth region, and the second region is connected to the third region. In the second region, the first region is connected to the second region, and the third region is connected to the fourth region. A common connection point of the first region, the second region, the third region, and the fourth region is the symmetrical center of the touch unit. Wherein, both the first region and the fourth region have the first branch pattern and the fourth branch pattern, and both the second region and the third region have the second branch pattern and the third branch pattern.

Furthermore, the first branch pattern includes a plurality of first branch electrodes and a plurality of first secondary branch electrodes. The first branch electrodes are electrically connected to the first connection center. The first secondary branch electrode is disposed on a side of the first branch pattern away from the first main branch electrode and is parallel to the first main branch electrode. In the first branch pattern, the first branch electrodes located on a side of the first connection center close to the first main branch electrode are electrically connected to the first main branch electrode, and the first branch electrodes located on a side of the first connection center away from the first main branch electrode are electrically connected to the first secondary branch electrode.

The third branch pattern includes a plurality of first branch electrodes, a plurality of first secondary branch electrodes, and a first connection electrode. The first branch electrodes are disposed on two sides of the second connection center and are electrically insulated from the second connection center. The first secondary branch electrodes are respectively disposed on a side of the fourth branch pattern close to the second main branch electrode and a side of the fourth branch pattern away from the second main branch electrode, and are parallel to the second main branch electrode. The first connection electrode is electrically connected to the first secondary branch electrodes and located on a side of the third branch pattern away from the first main branch electrode. In the third branch pattern, an end of the first branch electrode away from the second connection center is electrically connected to the first secondary branch electrode, and the first secondary branch electrode away from the second main branch electrode is electrically connected to the first main branch electrode.

Furthermore, in the first branch pattern, at least one first opening is enclosed by the first branch electrode, the first main branch electrode, and the first secondary branch electrode. In the third branch pattern, at least one third opening is enclosed by the first branch electrode and the first secondary branch electrode. First dummy electrodes are disposed in the first opening and the third opening. The first dummy electrodes are electrically insulated from the first electrode.

Furthermore, the second branch pattern includes a plurality of second branch electrodes and a plurality of second secondary branch electrodes. The second branch electrodes are connected to the second connection center. The second secondary branch electrodes are respectively disposed on a side of the second branch pattern close to the first main branch electrode and a side of the second branch pattern away from the first main branch electrode, and are parallel to the first main branch electrode. In the second branch pattern, an end of the second branch electrodes away from the second connection center are electrically connected to the second secondary branch electrode, and the second secondary branch electrode close to the first main branch electrode is electrically connected to the second main branch electrode.

The fourth branch pattern includes a plurality of second branch electrodes, a plurality of second secondary branch electrodes, and a second connection electrode. The second branch electrodes are disposed on two sides of the first connection center and are electrically insulated from the first connection center. The second secondary branch electrodes are disposed on a side of the fourth branch pattern away from the second main branch electrode and are parallel to the second main branch electrode. A second connection electrode is electrically connected to the second main branch electrode and the second secondary branch, and is located on a side of the first branch pattern away from the first main branch electrode. In the fourth branch pattern, the second branch electrodes located on a side of the first connection center close to the second main branch electrode are connected to the second main branch electrode, and the second branch electrodes located on a side of the first connection center away from the second main branch electrode are electrically connected to the second secondary branch electrode.

Furthermore, in the second branch pattern, at least one second opening is enclosed by the second branch and the second secondary branch electrode. In the fourth branch pattern, at least one fourth opening is enclosed by the second branch electrode, the second main branch electrode, and the second secondary branch electrode. Second dummy electrodes are disposed in the second opening and the fourth opening, and the second dummy electrodes are electrically insulated from the second electrode.

Furthermore, the second branch electrode is disposed on at least one side of the first branch electrode, a gap is between the first branch electrode and the second branch electrode, a third dummy electrode is disposed in the gap, and the third dummy electrode is electrically insulated from the first electrode and the second electrode.

Furthermore, the touch substrate further includes a plurality of first electrode groups and a plurality of second electrode groups. The first electrode groups are arranged along the second direction and extend along the first direction. The second electrode groups are arranged along the first direction and extend along the second direction.

The touch units are arranged in the touch substrate in an array manner. In the first direction, the first electrodes in two adjacent touch units are electrically connected to each other, and a plurality of the first electrodes electrically connected to each other combine to form one of the first electrode groups. In the second direction, the second electrodes in two adjacent touch units are electrically connected to each other, and a plurality of the second electrodes electrically connected to each other combine to form one of the second electrode groups.

Furthermore, in the first electrode group, two adjacent first electrodes are connected to each other through a first connection portion, and the first electrodes on two sides of the first connection portion are center-symmetrical with the first connection portion acting as a central point. In the second electrode group, two adjacent second electrodes are connected to each other through a second connection portion, and the second electrodes on two sides of the second connection portion are center-symmetrical with the second connection portion acting as a central point. Wherein, an area of the first connection portion is less than an area of the second connection portion.

Furthermore, at least two of the first main branch electrodes and at least two of the first secondary branch electrodes are directly connected to the first connection portion, and form a cross-shaped structure. At least two of the second main branch electrodes and at least two of the second secondary branch electrodes are directly connected to the second connection portion, and form a cross-shaped structure.

Furthermore, the touch units further include fourth dummy electrodes. The fourth dummy electrode is disposed on an edge of the touch units and is located on a side of the third branch pattern and the fourth branch pattern away from the first branch pattern and the second branch pattern, and the fourth dummy electrodes are electrically insulated from the first electrode and the second electrode.

Furthermore, in each of the touch units, one first connection portion or one second connection portion is between two adjacent fourth dummy electrodes, an end of the fourth dummy electrode has the first connect position, and another end of the fourth dummy electrode has the second connect position. In four touch units arranged in the array manner, four fourth dummy electrodes between two adjacent first connection portions or two adjacent second connection portions are connected to each other and form a radial structure.

Furthermore, the first main branch electrode includes two first main branch sub-electrodes, the main branch sub-electrodes are respectively located on two sides of the second main branch electrode and are bridged through at least one conductive bridge.

Furthermore, the conductive bridge includes a first connection segment and a second connection segment that are connected perpendicularly, and a length of the second connection segment is less than a length of the first connection segment.

Furthermore, a minimum value of widths of branch electrodes in the first electrode and the second electrode is greater than a size of two sub-pixels.

Furthermore, the first electrode and the second electrode are composed of metal meshes or a transparent conductive material.

The present invention further provides a display panel. The display panel includes the aforesaid touch substrate.

The beneficial effects of the present invention are that: the present invention provides a touch substrate and a display panel; by the design of the branch circuits being distributed uniformly, and interlaced and enclosed with each other, the distribution of the mutual capacitance electric field in each touch unit is more uniform; furthermore, the area that the first electrode and the second electrode facing to each other is increased in the limited space, thereby increasing change amount of the parasitic capacitance of the first electrode and the second electrode after touched and effectively reducing RC delay of the touch units, so that sensitivity and accuracy of the touch substrate during recognizing the touch position are improved.

DESCRIPTION OF DRAWINGS

To more clearly illustrate the technical solutions of the embodiments of the present invention, the accompanying figures of the present invention will be described in brief. Obviously, the accompanying figures described below are only part of the embodiments of the present invention, from which figures those skilled in the art can derive further figures without making any inventive efforts.

Figure 1:
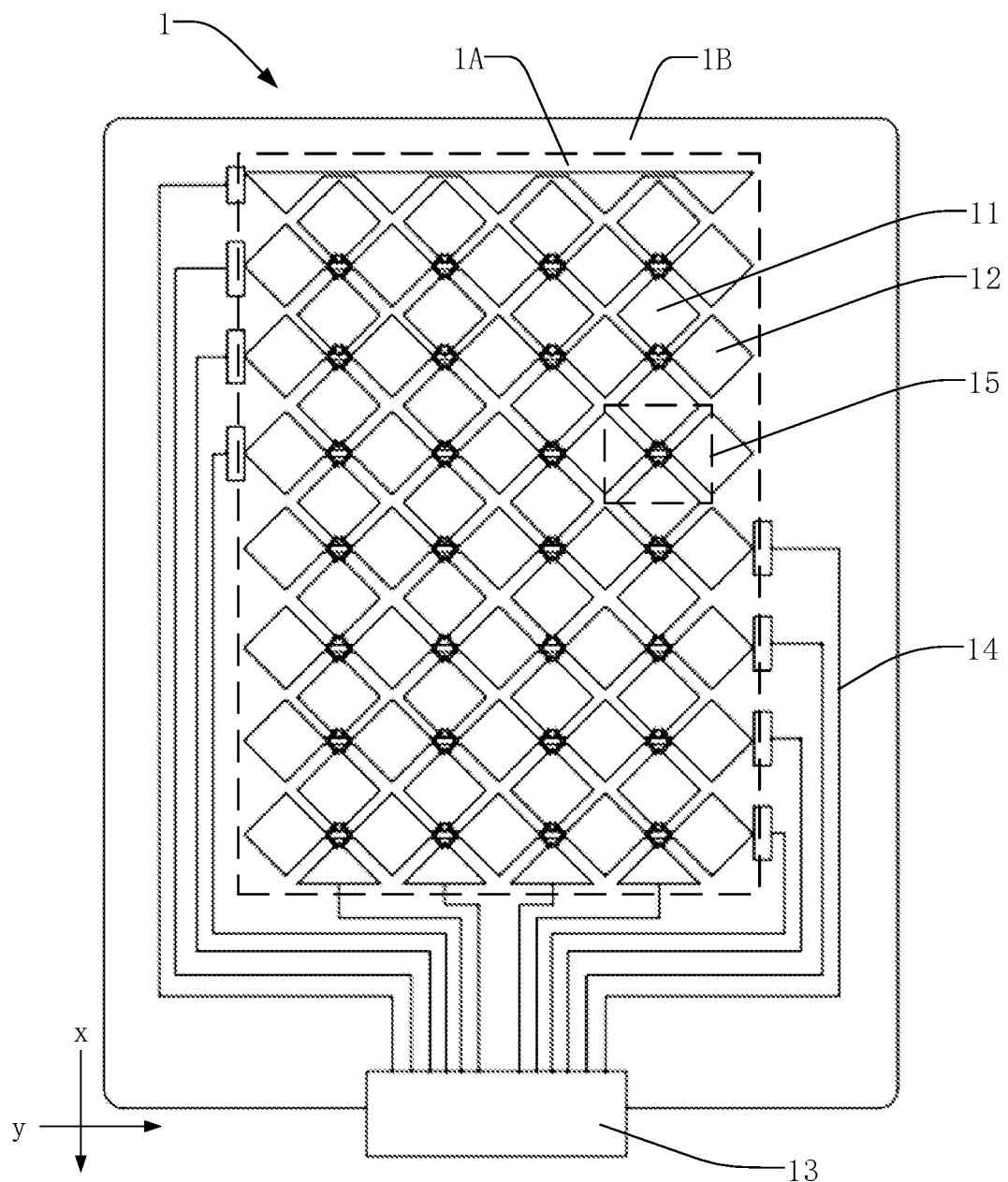
FIG. 1 is a structural schematic diagram of a touch substrate in one embodiment of the present invention.

The reference numbers of components in the drawings are as follows:
first direction x; second direction y;
touch substrate 1; touch region 1A;
non-touch region 1B; first electrode group 11;
first connection portion 11A; second electrode group 12;
second connection portion 12A; driving chip 13;
signal line 14; touch unit 15;
first region 15A; second region 15B;
third region 15C; fourth region 15D;
first electrode 100; first branch pattern 101;
third branch pattern 103; first main branch electrode 110;
first main branch sub-electrode 111; conductive bridge 112;
first connection segment 112a; second connection segment 112b;
first secondary branch 120; first branch electrode 130;
first connection electrode 140; first connection center 150;
first opening 160; third opening 170;
second electrode 200; second branch pattern 202;
fourth branch pattern 204; second main branch electrode 210;
second secondary branch electrode 220; second branch electrode 230;
second connection electrode 240; second connection center 250;
second opening 260; fourth opening 270;
gap 301; first dummy electrode 310;
second dummy electrode 320; third dummy electrode 330;
fourth dummy electrode 340; metal line 400;
fracture 410; insulation layer 500;
display panel 1000; substrate layer 2;
array substrate 3; light-emitting layer 4;
light-emitting device 41; thin-film encapsulation layer 5;
polarizer 6; cover plate 7.

DETAILED DESCRIPTION OF EMBODIMENTS

The preferred embodiments of the present invention are described below with reference to the accompanying drawings, which are used to take examples and exemplify the present invention can be implemented. The technical contents of the present invention can be fully described to those skilled in the art from these embodiments to make the technical content of the present invention be clearer and more easy to understand. The present invention can be presented in many different forms of embodiments, and the scope of the present invention is not limited to the embodiments set forth herein.

In the accompanying figures, elements with same structures are used same labels to indicate, and components that have similar structure or function are denoted by similar labels. Dimensions and thickness of each component shown in the accompanying figures are arbitrarily shown, and the present invention does not limit the dimensions and thickness of each component. In order to make the accompanying figures be clearer, the thickness of the components is appropriately exaggerated in some places in the accompanying figures.

Besides, the descriptions of embodiments below refer to accompanying drawings in order to illustrate certain invention embodiments which the present invention can implement. The directional terms of which the present invention mentions, for example, "top", "bottom", "left", "right", "inside", "outside", "side", etc., only refer to directions of the accompanying figures. Therefore, the used directional terms are for better and more clearly describing and understanding of the present invention but is not intended to indicate or imply that the indicated devices or elements must have a specific orientation or is constructed and operated in a specific orientation. Therefore, it should not be understood as a limitation on the present invention. In addition, the terms "first", "second", "third", etc. are used for descriptive purposes only and are not to be understood as indicating or implying relative importance.

When a component is described as "on" another component, the component can be placed directly on the other component; there can also be an intermediate component, the component is placed on the intermediate component, and the intermediate component is placed on another component. When a component is described as "mounted" or "connected to" another component, it can be understood as "directly mounted" or "directly connected to", or a component is "mounted" or "connected to" through an intermediate component to another component.

One embodiment of the present invention provides a touch substrate 1. As illustrated in FIG. 1. The touch substrate 1 has a touch region 1A and a non-touch region 1B connected to the touch region 1A.

In the touch region 1A, the touch substrate 1 includes a plurality of first electrode groups 11 and a plurality of second electrode groups 12. The first electrode groups 11 extend along a first direction x and are arranged along a second direction y, and each first electrode group 11 has a plurality of first electrodes 100 electrically connected to each other. The second electrode groups 12 extend along the second direction y and are arranged along the first direction x, and each second electrode group 12 has a plurality of second electrodes 200 electrically connected to each other. Wherein, the first direction x is perpendicular to the second direction y, thereby making the first electrode groups 11 and the second electrode groups 12 to be intersected with each other and making the first electrode groups 11 and the second electrode groups 12 to be insulated from each other.

In the non-touch region 1B, the touch substrate 1 includes a plurality of signal lines 14. The signal lines 14 are configured to electrically connect the first electrode groups 11 and the second electrode groups 12 to a driving chip 13, so capacitance data generated in the touch region 1A is transmitted to the driving chip 13 to be processed, thereby generating touch signals. Wherein, each of the signal lines 14 is electrically connected to one of the first electrode groups 11 or one of the second electrode groups 12, so the capacitance data generated in each row and each column of electrode groups can be transmitted to the driving chip 13.

In one of the first electrode groups 11 and one of the second electrode groups 12 that are intersected, a first electrode 100 and a correspondingly intersected second electrode 200 at an intersecting position form one touch unit 15. The plurality of first electrode groups 11 and the plurality of second electrode groups 12 intersect with each other and form the plurality of touch control units 15. The plurality of touch units 15 are arranged in the touch substrate 1 in an array manner along the first direction x and the second direction y. Each of the touch units 15 is provided with the first electrode 100 and the second electrode 200. Furthermore, an area of the first electrode 100 is equal to an area of the second electrode 15 in each of the touch units 15, making the first electrodes 100 and the second electrodes 200 to distributed uniformly in each of the touch units 15.

Figure 2:
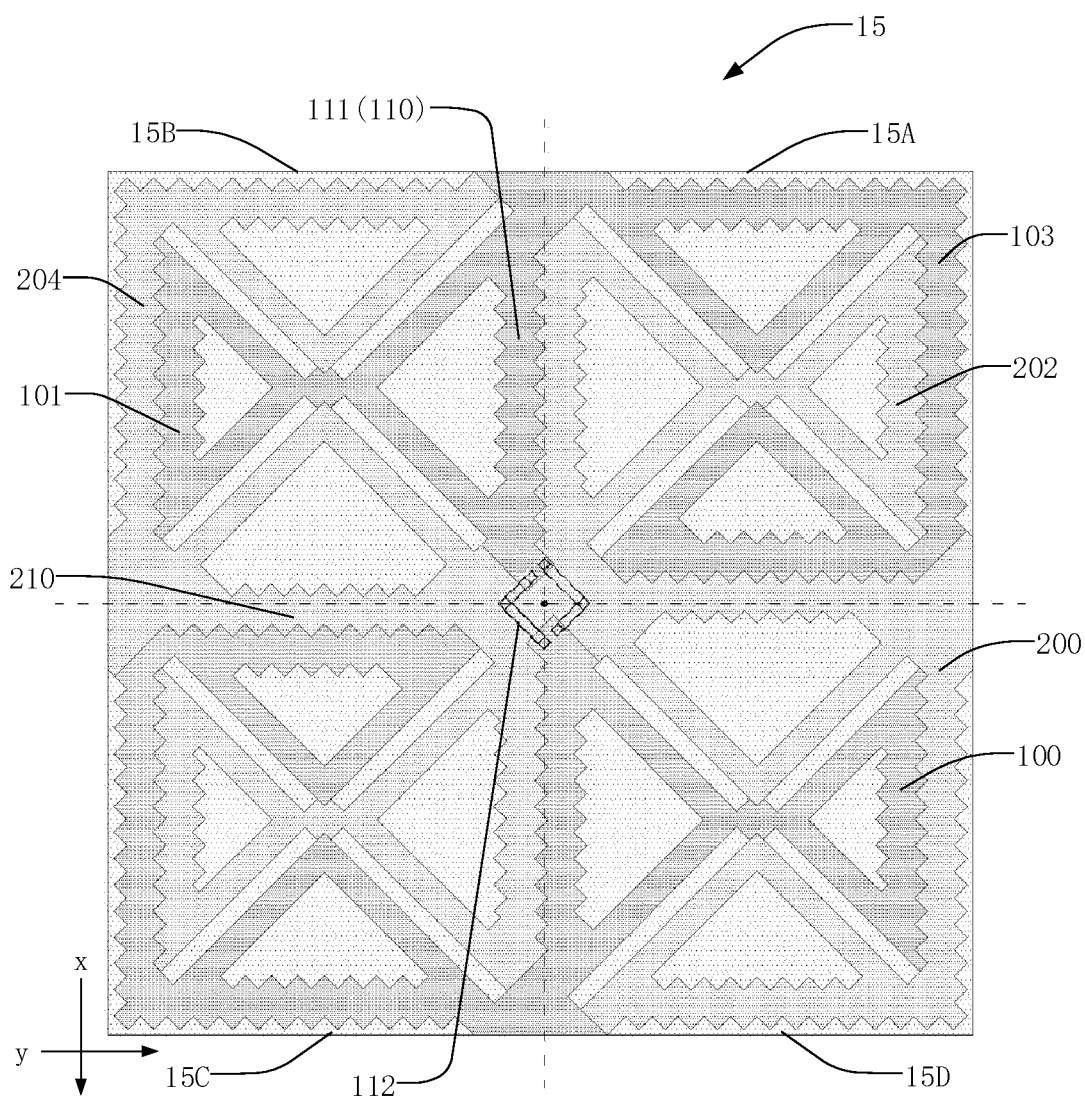
FIG. 2 is a planar schematic diagram of touch units in one embodiment of the present invention.

As illustrated in FIG. 2, the touch unit 15 has four rectangular regions arranged in an array manner. The rectangular regions are respectively a first region 15A, a second region 15B, a third region 15C, and a fourth region 15D. In the first direction x, the first region 15A is connected to the fourth region 15D, and the second region 15B is connected to the third region 15C. In the second region y, the first region 15A is connected to the second region 15B, and the third region 15C is connected to the fourth region 15D. A common connection point of the first region 15A, the second region 15B, the third region 15C, and the fourth region 15D is a symmetrical center of the touch units 15. The first electrode 100 and the second electrode 200 in the touch control unit 15 are center-symmetrical with the symmetrical center acting as a central point.

Wherein, the first electrode 100 and the second electrode 200 in the first region 15A, and the first electrode 100 and the second electrode 200 in the third region 15C are center-symmetrical with the symmetrical center acting as a central point, and the first electrode 100 and the second electrode 200 in the second region 15B, and the first electrode 100 and the second electrode 200 in the fourth region 15C are center-symmetrical with the connection center acting as a central point.

As illustrated in FIG. 2, the first electrode 100 includes a first main branch electrode 110, and a first branch pattern 101 and a third branch pattern 103 disposed on two sides of the first main branch electrode 110; and the second electrode 200 includes a second main branch electrode 210, and a second branch pattern 202 and a fourth branch pattern 204 disposed on two sides of the second main branch electrode 210. Wherein, the first main branch electrode 110 is parallel to the first direction x, the second main branch electrode 210 is parallel to the second direction y, and an intersection point of the first main branch electrode 110 and the second main branch electrode 210 corresponds to the symmetrical center. The first branch pattern 101 and the fourth branch pattern 204 are located in the second region 15B and the fourth region 15D, and the second branch pattern 202 and the third branch pattern 103 are located in the first region 15A and the third region 15C.

Figure 3:
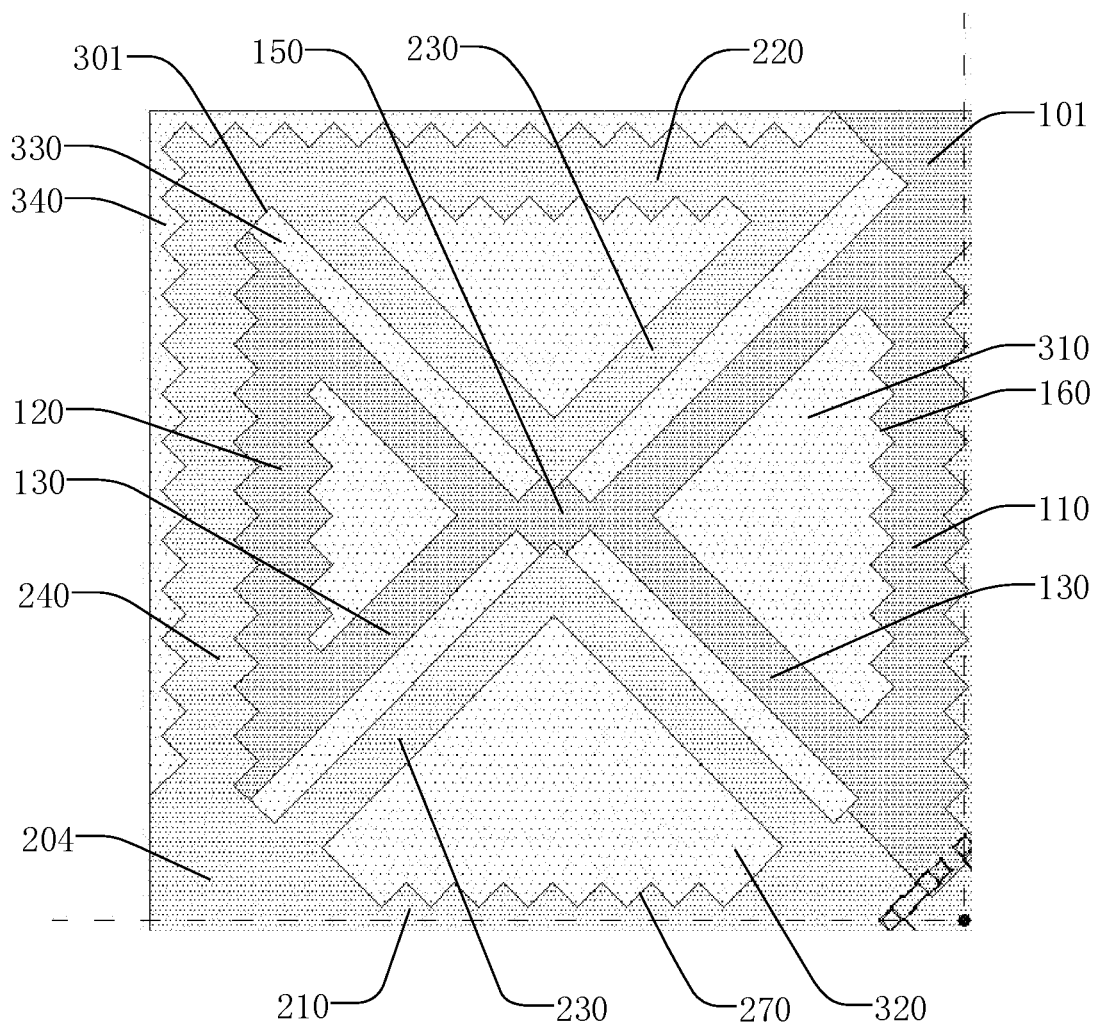
FIG. 3 is a schematic diagram of an enlargement of the touch unit in a second region in one embodiment of the present invention.

As illustrated in FIG. 3, in the second region 15B, the first branch pattern 101 extends along the second direction y and has a first secondary branch electrode 120, four first branch electrodes 130, and a first connection center 150. The first secondary branch electrode 120 is disposed on a side of the first branch pattern 101 away from the first main branch electrode 110 and is parallel to the first main branch electrode 110. The first connection center 150 corresponds to a central point of the second region 15B, and the first branch electrodes 130 are uniformly disposed on two sides of the first connection center 150.

Wherein, two of the first branch electrodes 130 are disposed on a side of the first connection center 150 close to the first main branch electrode 110, and another two of the first branch electrodes 130 are disposed on a side of the first connection center 150 away from the first main branch electrode 110. The two first branch electrodes 130 located on the same side of the first connection center 150 intersect perpendicularly with each other, and the intersection position is connected to the first connection center 150. Therefore, a structure that the first branch pattern 101 diffuses toward two sides of the first connection center 150 in the second direction y with the first connection center 150 acting as a central point is formed. The first branch electrodes 130 located on the side of the first connection center 150 close to the first main branch electrode 110 are electrically connected to the first main branch electrode 110, and a triangular first opening 160 is formed and enclosed by the first main branch electrode 110 and the first branch electrodes 130. The first branch electrodes 130 located on the side of the first connection center 150 away from the first main branch electrode 110 are electrically connected to the first secondary branch electrode 120, and one triangular first opening 160 is also formed and is enclosed by the first branch electrodes 130 and the secondary branch electrode 120.

As illustrated in FIG. 3, in the second region 15B, the fourth branch pattern 204 extends along the first direction x and includes second branch electrodes 220, four second secondary branch electrodes 230, and a second connection electrode 240. The second secondary branch electrodes 220 are disposed on a side of the fourth branch pattern 204 away from the second main branch electrode 210 and are parallel to the second main branch electrode 210. The second branch electrodes 230 are uniformly disposed on two sides of the first connection center 150. The second connection electrode 240 is electrically connected to the second main branch electrode 210 and the second secondary branch electrodes 220.

Wherein, two of the second branch electrodes 230 are disposed on a side of the first connection center 150 close to the second main branch electrode 210, and another two of the second branch electrodes 230 are disposed on a side of the first connection center 150 away from the second main branch electrode 210. The two second branch electrodes 230 located on the same side of the first connection center 150 intersect perpendicularly with each other, the intersection position partially overlaps with the first connection center 150 but is kept electrically insulated from the first connection center 150. Therefore, a structure that the fourth branch pattern 204 diffuses toward two sides of the first connection center 150 in the first direction x with the first connection 150 center acting as a central point is formed. The second branch electrodes 230 located on the side of the first connection center 150 close to the second main branch electrode 210 are connected to the second main branch electrode 210, and a triangular fourth opening 270 is formed and enclosed by the second branch electrodes 230 and the second main branch electrode 210. The second branch electrodes 230 located on the side of the first connection center 150 away from the second main branch electrode 210 are connected to the second secondary branch electrode 220, and a triangular fourth opening 270 is also formed and enclosed by the second branch electrodes 230 and the second secondary branch electrode 220. The second connection electrode 240 is disposed on a side of the fourth branch pattern 204 away from the first main branch electrode 110 and is parallel to the first main branch electrode 110.

In the second region 15B, the second main branch electrode 210, the second secondary branch electrode 220, and the second connection electrode 240 enclose the first branch pattern 101.

Figure 4:
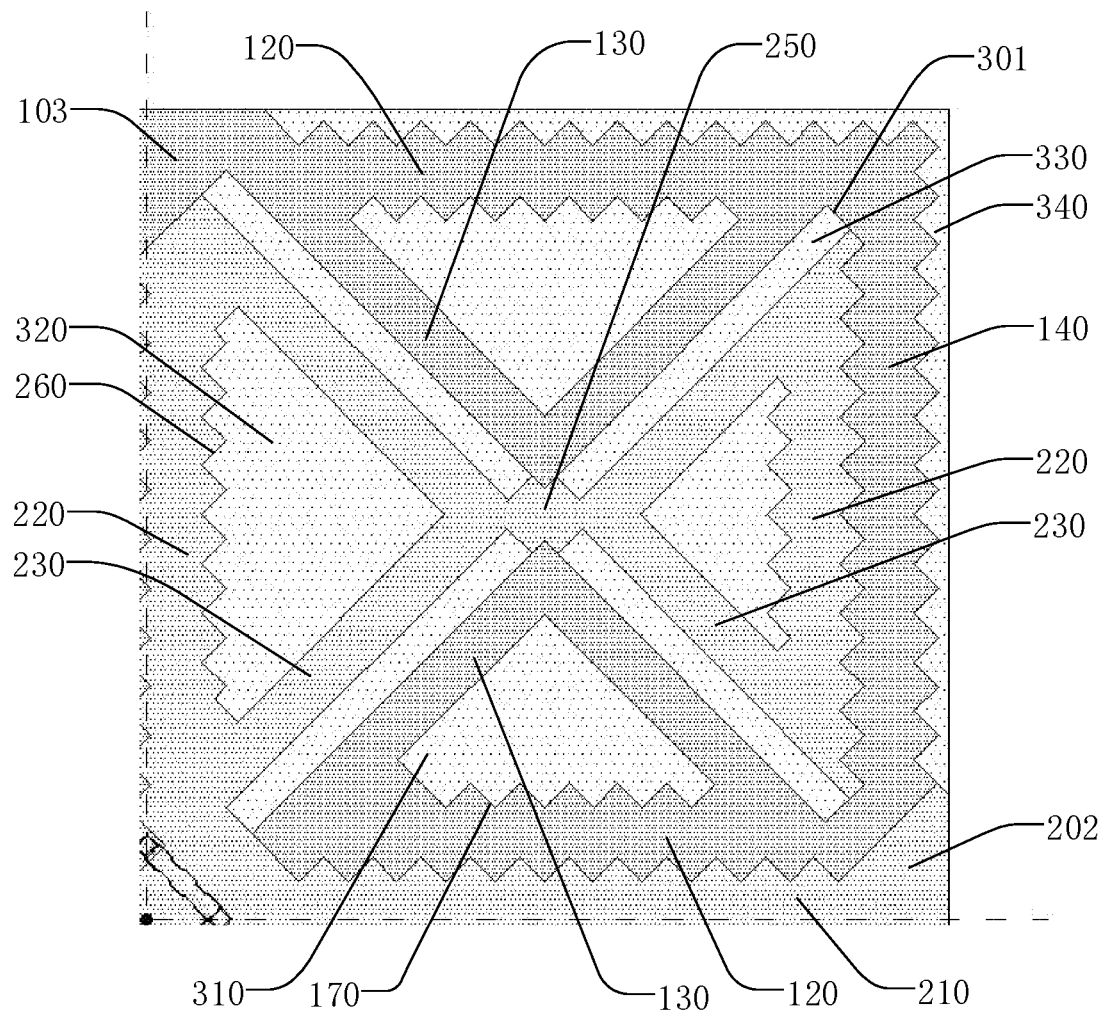
FIG. 4 is a schematic diagram of an enlargement of the touch unit in a first region in one embodiment of the present invention.

As illustrated in FIG. 4, in the first region 15A, the second branch pattern 202 extend along the second direction y. The second branch pattern 202 has the second secondary branch electrode 220 and the second branch electrode 230. Furthermore, an electrode pattern formed by the second secondary branch electrode 220 and the second branch electrode 230 in the second branch pattern 202, and the first branch pattern 101 in the second region 15B are axisymmetric structures. Specifically, the second branch pattern 202 includes two of the second secondary branch electrodes 220, four of the second branch electrodes 230, and one second connection center 250. The second connection center 250 corresponds to a central point of the first region 15A, and the second branch electrodes 230 are uniformly disposed on two sides of the second connection center 250. The second secondary branch electrodes 220 are disposed on two sides of the second branch pattern 202 and are parallel to the first main branch electrode 110. An end of the second branch electrode 230 away from the second connection center 250 is electrically connected to the second secondary branch electrode 220. The second secondary branch electrode 220 close to the first main branch electrode 110 is electrically connected to the second main branch electrode 210.

Wherein, two of the second branch electrodes 230 are disposed on a side of the second connection center 250 close to the first main branch electrode 110, and another two of the second branch electrodes 230 are disposed on a side of the second connection center 250 away from the first main branch electrode 110. The two second branch electrodes 230 located on the same side of the second connection center 250 intersect perpendicularly with each other, and the intersection position is connected to the second connection center 250. Therefore, a structure that the second branch pattern 202 diffuses toward two sides of the second connection center 250 in the second direction y with the second connection center 250 acting as a central point is formed. The second secondary branch electrode 220 located on a side of the second connection center 250 close to the first main branch electrode 110 is electrically connected to the second branch electrodes 230, and a triangular second opening 260 is enclosed by the second secondary branch electrode 220 and the second branch electrodes 230. The second secondary branch electrode 220 located on a side of the second connection center 250 away from the first main branch electrode 110 is electrically connected to the second branch electrodes 230, and a triangular second opening 260 is also enclosed by the second secondary branch electrode 220 and the second branch electrodes 230.

As illustrated in FIG. 4, in the first region 15A, the third branch pattern 103 extends along the first direction x and includes two first secondary branch electrodes 120, four first branch electrodes 130, and a first connection electrode 140. The first secondary branch electrodes 120 are disposed on two sides of the fourth branch pattern 204 and are parallel to the second main branch electrode 210. The first secondary branch electrode 120 away from the second main branch electrode 210 is electrically connected to the first main branch electrode 110. The first branch electrodes 130 are uniformly disposed on two sides of the second connection center 250, and one end of the first branch electrodes 130 away from the second connection center 250 is electrically connected to the first secondary branch electrode 120. Two ends of the first connection electrode 140 are respectively electrically connected to the first secondary branch electrode 120.

Wherein, two of the first branch electrodes 130 are disposed on a side of the first connection center 150 close to the second main branch electrode 210, and another two of the first branch electrodes 130 are disposed on a side of the second connection center 250 away from the second main branch electrode 210. The two first branch electrodes 130 located on the same side of the second connection center 250 intersect perpendicularly with each other, the intersection position partially overlaps with the second connection center 250 but is kept electrically insulated from the second connection center 250. Therefore, a structure that the third branch pattern 103 diffuses toward two sides of the second connection center 250 in the first direction x with the second connection center 250 acting as a central point is formed. The first secondary branch electrode 120 located on a side of the second connection center 250 close to the second main branch electrode 210 is electrically connected to the first branch electrodes 130, and a triangular third opening 170 is enclosed by the first secondary branch electrode 120 and the first branch electrodes 130. The first secondary branch electrode 120 located on a side of the second connection center 250 away from the second main branch electrode 210 is electrically connected to the first branch electrodes 130, and a triangular third opening 170 is also enclosed by the first secondary branch electrode 120 and the first branch electrodes 130. The first connection electrode 140 is disposed on a side of the third branch pattern 103 away from the first main branch electrode 110 and is parallel to the first main branch electrode 110.

In the first region 15A, the first main branch electrode 110, the first secondary branch electrode 120, and the first connection electrode 140 enclose the second branch pattern 202.

As illustrated in FIG. 2, according to a principle of geometric symmetry, the structures of the first electrode 100 and the second electrode 200 in the third region 15C are same as those in the first region 15A, and are center-symmetrical with the symmetrical center acting as the central point; and the structures of the first electrode 100 and the second electrode 200 in the fourth region 15D are also same as those in the second region 15B, and are also center-symmetrical with the symmetrical center acting as the central point.

Wherein, the first main branch electrode 110, the first secondary branch electrode 120 close to the second main branch electrode 210 and parallel to the second main branch electrode 210, and the first branch electrodes 130 disposed on the side of the aforesaid first main branch electrode 110 and the first secondary branch electrode 120 forms a pinwheel-shaped structure with the symmetrical center acting as the central point, and the first branch electrodes 130 in the pinwheel-shaped structure are distributed in a counterclockwise direction. The second main branch electrode 210, the second secondary branch electrode 220 close to the first main branch electrode 110 and parallel to the first main branch electrode 110, and the second branch electrodes 230 disposed on the side of the aforesaid second main branch electrode 210 and the second secondary branch electrode 220 forms a pinwheel-shaped structure with the symmetrical center acting as the central point, and the second branch electrodes 230 in the pinwheel-shaped structure are distributed in a clockwise direction.

In one same touch unit 15, the central point of the pinwheel-shaped structure in the first electrode 100 and the central point of the pinwheel-shaped structure in the second electrode 200 both overlap with the symmetrical center, which makes the pinwheel-shaped structure in the first electrode 100 and the pinwheel-shaped structure in the second electrode 200 intersect and match with each other to form a quadrilateral structure. In this way, one second secondary branch electrode 220 is disposed on the side of the first main branch electrode 110 away from the first connection center 150 in the first region 15A and the second region 15B. Similarly, in the first region 15A and the fourth region 15D, one first secondary branch electrode 120 is also disposed on the side of the second main branch electrode 210 close to the second connection center 250. Furthermore, in the quadrilateral structure formed by the combination of the pinwheel-shaped structures, two diagonal lines thereof respectively overlap with the first main branch electrode 110 and the second main branch electrode 210. The two pinwheel-shaped structures that intersect and match with each other make a structure of the second openings 260 be defined on two sides of a structure of each first opening 160, and also make the structure of the first openings 160 be defined on two sides of the structure of each second opening 260. In this way, the distribution of the first electrode 100 and the second electrode 200 is more uniform, and an coverage area is larger, which reduces recognition of blind spots and improves the touch sensitivity.

Furthermore, in the touch units 15, the first branch electrode 130 is inclined to the first main branch electrode 110 and forms a first included angle, and the first included angle is greater than 0° and less than 90°. Preferably, the first included angle between the first branch electrode 130 and the first main branch electrode 110 is 45°. One side of each of the first branch electrodes 130 away from the opening is provided with one second branch electrodes 230, and the second branch electrode 230 is parallel to the first branch electrode 130. A width of the first branch electrode 130 is smaller than widths of the first main branch electrode 110, the first secondary branch electrode 120 and the first connection electrode 140, and a width of the second branch electrode 230 is smaller than widths of the second main branch electrode 210, the second secondary branch electrode 220, and the second connection electrode 240. Furthermore, a minimum value of widths of branch electrodes in the first electrode 100 and the second electrode 200 is greater than a size of two sub-pixels, i.e., the minimum widths of the first branch electrode 130 and the second branch electrode 230 are both larger than the size of two sub-pixels.

Figure 5:
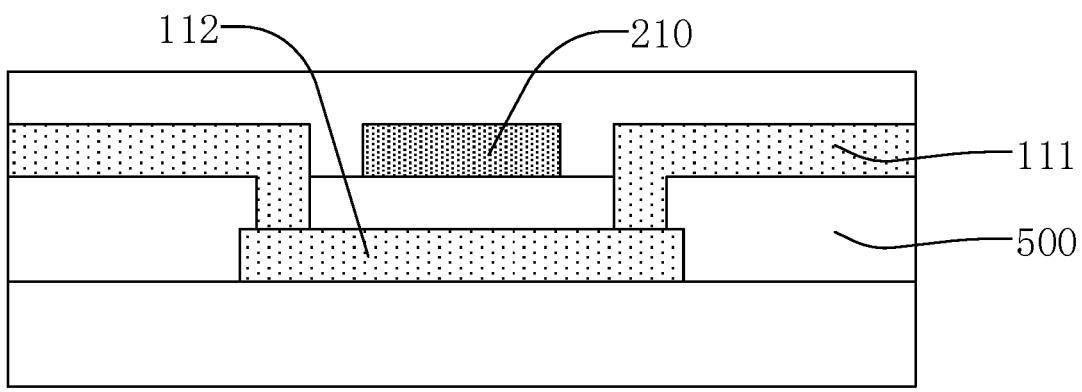
FIG. 5 is a schematic diagram of a layer structure of a conductive bridge in one embodiment of the present invention.

The first electrode 100 and the second electrode 200 are disposed electrically insulated from each other. Specifically, as illustrated in FIG. 2 and FIG. 5, the first electrode 100 and the second electrode 200 are located in a same metal layer, the first main branch electrode 110 includes two first main branch sub-electrodes 111, the two first main branch sub-electrodes 111 are respectively disposed on two sides of the second main branch electrode 210, and the two first main branch sub-electrodes 111 are electrically connected to each other through the bridge connection of the conductive bridge 112, thereby preventing electrical connection between the first electrode 100 and the second electrode 200. Wherein, an insulation layer 500 is disposed between the conductive bridge 112 and the second main branch electrode 210, and the first main branch sub-electrode 111 penetrates through the insulation layer 500 and is electrically connected to the conductive bridge 112 under the second main branch electrode 210.

Figure 6:
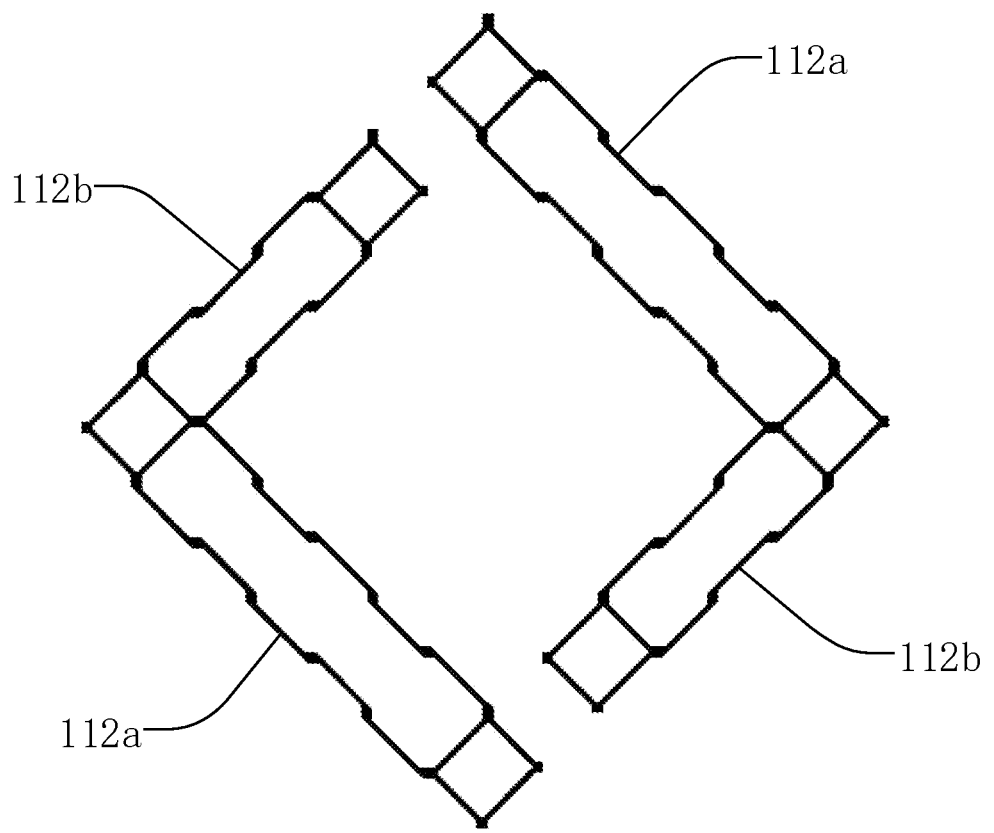
FIG. 6 is a planar schematic diagram of the conductive bridge in one embodiment of the present invention.

The present invention does not limit a number and the structure of the conductive bridges 112. A double-bridge structure as shown in FIG. 2 can be adopted, and the two conductive bridges 112 are independent and not connected to each other. Furthermore, because the touch unit 15 is the centrosymmetric structure, the two conductive bridges 112 are also center-symmetrical with the symmetrical center acting as a central point. Specifically, as illustrated in FIG. 6, the conductive bridge 112 is not an axisymmetric structures, and includes a first connection segment 112a and a second connection segment 112b that are connected perpendicularly, and a length of the first connection segment 112a is greater than a length of the second connection segment 112b. By disposing the two aforesaid conductive bridges 112 in a center-symmetrical manner with the symmetrical center, a distance between the two conductive bridges 112 can be reduced, which is more difficult to be detected by the human eye, and has better optical effects.

Figure 7:
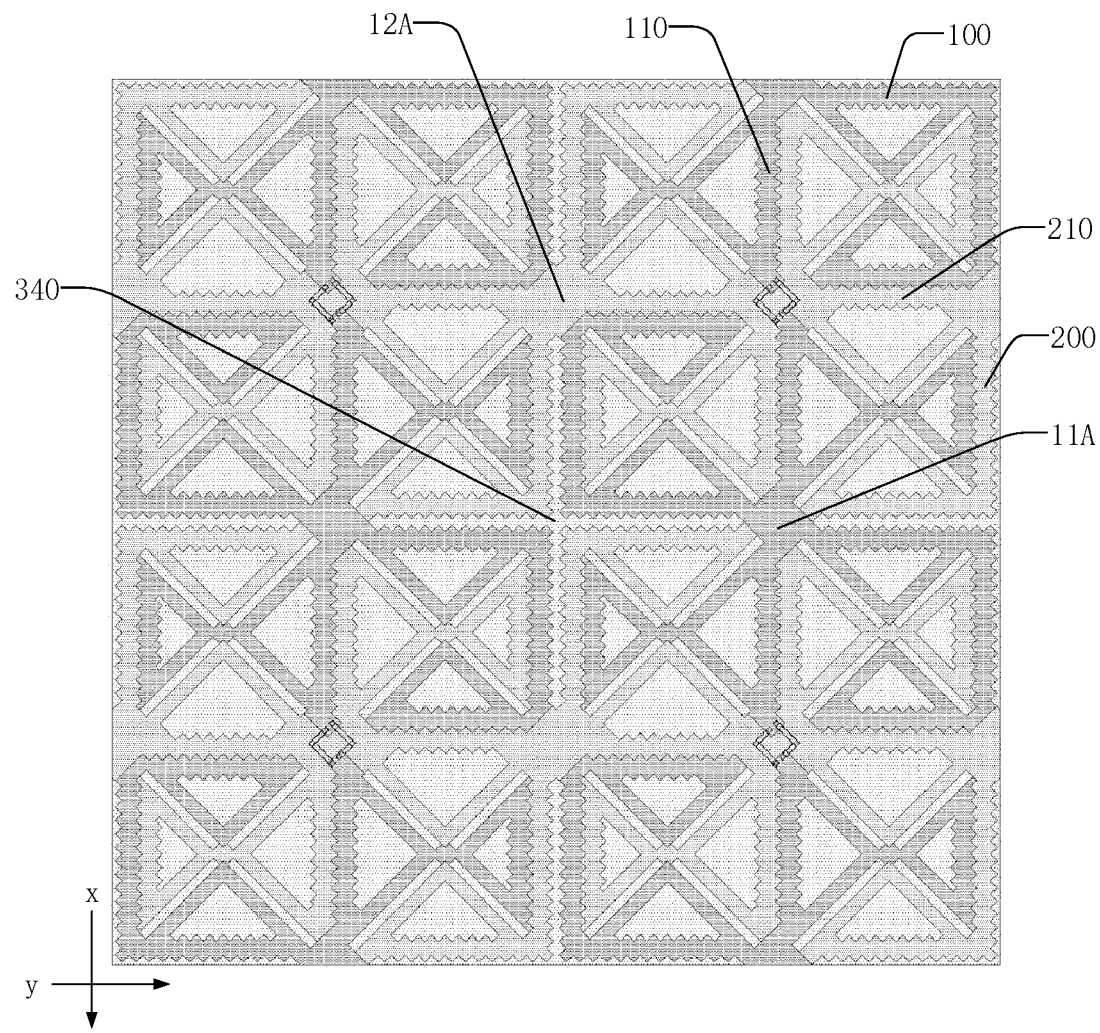
FIG. 7 is a planar schematic diagram of four touch units arranged in an array manner in one embodiment of the present invention.

Furthermore, as illustrated in FIG. 7, in the first direction x, the two first main branch electrodes 110 in two adjacent touch units 15 are electrically connected to each other through a first connection portion 11A, so that the two adjacent first electrodes 100 are electrically connected to each other. Furthermore, the two first electrodes 100 electrically connected to each other are center-symmetrical with the first connection 11A acting as a central point, and the two second electrodes 200 in the two adjacent touch units 15 in the first direction x are insulated from each other, thereby forming the first electrode group 15 extending along the first direction x. In the second direction x, the two second main branch electrodes 210 in two adjacent touch units 15 are electrically connected to each other through a second connection portion 12A, so that the two adjacent second electrodes 200 are electrically connected to each other. Furthermore, the two second electrodes 200 electrically connected to each other are center-symmetrical with the second connection 12A acting as a central point, and the two first electrodes 100 in the two adjacent touch units 15 in the second direction y are insulated from each other, thereby forming the second electrode group 12 extending along the second direction y. Wherein, an orthogonal projection area of one first connection portion 11A on the touch substrate 1 is smaller than an orthogonal projection area of one second connection portion 12A on the touch substrate 1.

As illustrated in FIG. 7, the first connection portion 11A is directly connected to the two first main branch electrodes 110 in the adjacent two touch control units 15. Furthermore, in the first direction x, the two first main branch electrodes 110 are respectively arranged on two sides of the first connection portion 11A. Meanwhile, two adjacent first secondary branch electrodes 120 parallel to the second main branch electrode 210 and electrically connected to the aforesaid two first main branch electrodes 110 are also directly connected to the corresponding first main branch electrode 110 at the first connection portion 11A. Furthermore, in the second direction x, the two first secondary branch electrodes 120 are also respectively arranged on two sides of the first connection portion 11A. Furthermore, the two first main branch electrodes 110 and the two first secondary branch electrodes 120 directly connected to the first connection portion 11A are perpendicular to each other and form a electrode pattern with a cross-shaped structure.

The second connection portion 12A is directly connected to the two second main branch electrodes 210 in the two adjacent touch units 15. Furthermore, in the second direction y, the two second main branch electrodes 210 are respectively arranged on two sides of the second connection portion 12A. Meanwhile, two adjacent second connection electrodes 240 parallel to the first main branch electrode 110 and electrically connected to the aforesaid two first main branch electrodes 110 are also directly connected to the corresponding second main branch electrode 210 at the second connection portion 12A. Furthermore, in the first direction x, the two second connection electrodes 240 are also respectively arranged on two sides of the second connection portion 12A. Furthermore, the two second main branch electrodes 210 and the two second connection electrodes 240 directly connected to the second connection portion 12A are perpendicular to each other and also form a electrode pattern with a cross-shaped structure.

In one embodiment of the present invention, the first electrodes 100 are driving electrodes, and the second electrodes 200 are sensing electrodes. When a finger touches a display device provided with the touch substrate 1 in the embodiments of the present invention, parasitic capacitance between the first electrode 100 and the second electrode 200 at the position where the finger touches increases, and the driving chip 13 obtains the change amount of the parasitic capacitance of before and after the touch to detect the specific position of the finger touch. Therefore, when the change amount of the capacitance incurred by the touch is small, conventional capacitive touch screens may not be able to accurately detect whether there is a touch inputted.

However, in the embodiments of the present invention, as illustrated in FIG. 2, the first electrodes 100 and the second electrodes 200 in each region of the touch control units 15 are uniformly distributed, and are mutually engaged and enclosed with each other. Therefore, the second electrode 200 is disposed on one side of each branch electrode in the first electrode 100, while the first electrode 100 is also provided on one side of each branch electrode in the second electrode 200, and the area that the first electrode 100 and the second electrode 200 facing to each other is increased in the limited space, thereby increasing parasitic capacitance and change amount of the parasitic capacitance between the first electrode 100 and the second electrode 200, reducing RC delay of the entire touch units 15, improving sensitivity of the touch substrate 1 during recognizing the touch position, and increasing a report rate of the touch substrate 1.

Meanwhile, the first electrodes 100 and the second electrodes 200 are uniformly distributed in the touch units 15, so that the mutual capacitance electric field between the first electrodes 100 and the second electrodes 200 are also distributed more uniformly, thereby improving detection efficiency and accuracy when the touch substrate 1 recognizes the touch positions.

Furthermore, each of the touch units 15 has the dummy electrodes. As illustrated in FIGS. 2 to 4, the dummy electrodes include a first dummy electrode 310, a second dummy electrode 320, a third dummy electrode 330, and a fourth dummy electrode 340.

The first dummy electrodes 310 are disposed in the two first openings 160 in the first branch pattern 101 and the two third openings 170 in the third branch pattern 103, and the first dummy electrode 310 is electrically insulated from the first main branch electrode 110, the first secondary branch electrode 120, and the first branch electrode 130 and is not connected to each other.

The second dummy electrodes 320 are disposed in the two second openings 260 in the second branch pattern 202 and the two fourth openings 270 in the fourth branch pattern, and the second dummy electrode 320 is electrically insulated from the second main branch electrode 210, the second secondary branch electrode 220, and the second branch electrode 230 and is not connected to each other.

The first dummy electrode 310 and the second dummy electrode 320 match the shapes of the first openings 160 and the second openings 260 respectively. Therefore, in one embodiment of the present invention, the first dummy electrode 310 and the second dummy electrode 320 are dummy electrode patterns of triangular structures.

A gap 301 is between the first branch electrode 130 and the second branch electrode 230, the third dummy electrode 330 is disposed in the gap 301, and the third dummy electrode 330 is also kept electrically insulated from the first branch electrode 130 and the second branch electrode 230.

In the first region 15A and the third region 15C of the touch unit 15, the third dummy electrodes 330 are respectively arranged into a circular array with the two second connection centers 250 acting as the central points, and the two adjacent third dummy electrodes 330 are perpendicular to each other, thereby respectively forming two X-shaped dummy electrode patterns in the first region 15A and the third region 15C. Similarly, in the second region 15B and the fourth region 15D, the third dummy electrodes 330 are respectively arranged into a circular array with the first connection centers 150 acting as the central points, and the two adjacent third dummy electrodes 330 are perpendicular to each other, thereby respectively forming two X-shaped dummy electrode patterns in the second region 15B and the fourth region 15C. Furthermore, in each rectangular region of the touch units 1, one first dummy electrode 310 or one second dummy electrode 320 is between the two third dummy electrodes 330 perpendicular to each other, thereby making the dummy electrodes in the touch unit 15 can also be distributed uniformly.

The fourth dummy electrode 340 is disposed on an edge of the touch units 15 and is located on a side of the third branch pattern 103 and the fourth branch pattern 204 away from the first branch pattern 101 and the second branch pattern 202, and the fourth dummy electrode 340 is also kept being electrically insulated from the first electrode 100 and the second electrode 200.

As illustrated in FIG. 4 and FIG. 7, in the touch units 15, one first connection portion 11A or one second connection portion 12A is between two adjacent fourth dummy electrodes 340, an end of each of the fourth dummy electrodes 340 has one first connect position 11A, and another end of each of the fourth dummy electrodes 340 has one second connect position 12A.

Specifically, in one of the touch units 15, which has two first connection portions 11A and two second connection portions 12A, and the two first connection portions 11A and the two second connection portions 12A are respectively located at two ends of the first main branch electrode 110 and two ends of the second main branch electrode 210.

In the second region 15B and the fourth region 15D, the fourth dummy electrode 340 extends from a side of the first connection portion 11A to the second connection portion 12A along a side of the first secondary branch electrode 120 and the first connection electrode 140 of the third branch pattern 103 away from the second branch pattern 202, and forms a dummy electrode pattern with vertical angular structures matching the first secondary branch electrode 120 and the first connection electrode 140.

In the first region 15A and the third region 15C, the fourth dummy electrode 340 extends from a side of the first connection portion 11A to the second connection portion 12A along a side of the second secondary branch electrode 220 and the second connection electrode 240 of the fourth branch pattern 204 away from the first branch pattern 202, and forms a dummy electrode pattern with vertical angular structures matching the second secondary branch electrode 220 and the second connection electrode 240.

In four touch units 15 arranged in the array manner, four fourth dummy electrodes 340 between two adjacent first connection portions 11A or two adjacent second connection portions 12A are connected to each other and are spliced to form a dummy electrode pattern of a cross-shaped radial structure. Two sides of each branch of the dummy electrode pattern of the radial structure have branch electrodes in the first electrode 100 and branch electrodes in the second electrode 200 respectively.

As illustrated in FIG. 2, in the third region 15C and the fourth region 15D, the structure of the dummy electrodes is same as that in the first region 15A and the second region 15B. Furthermore, according to the principle of geometric symmetry, the dummy electrode in the third region 15C and the dummy electrode in the first region 15A are center-symmetrical with the symmetrical center acting as a central point, and the dummy electrode in the fourth region 15D and the dummy electrode in the second region 15B are center-symmetrical with the symmetrical center acting as a central point.

Electrical signals are not loaded in the first dummy electrode 310, the second dummy electrode 320, the third dummy electrode 330, and the fourth dummy electrode 340. Wherein, the first dummy electrode 310 and the second dummy electrode 320 are configured to reduce parasitic capacitance of the first electrode 100 and the second electrode 200 to a cathode in a display panel 1000. The third dummy electrode 330 is configured to increase change amount of parasitic capacitance between the first electrode 100 and the second electrode 200 during touch of a finger, thereby further improving the sensitivity of the touch substrate 1. The fourth dummy electrode 340 is configured to electrically insulate the first electrode 100 and the second electrode 200 in two adjacent touch units 15 to prevent short circuits therebetween, while can also eliminate the change amount of the parasitic capacitance of the first electrode 100 and the second electrode 200 between adjacent touch units 15.

Figure 8:
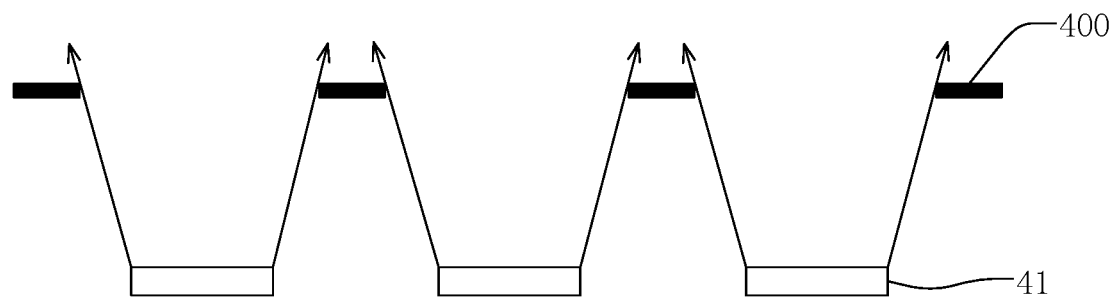
FIG. 8 is a schematic diagram of layers between a metal line and a light-emitting device in one embodiment of the present invention.
Figure 9:
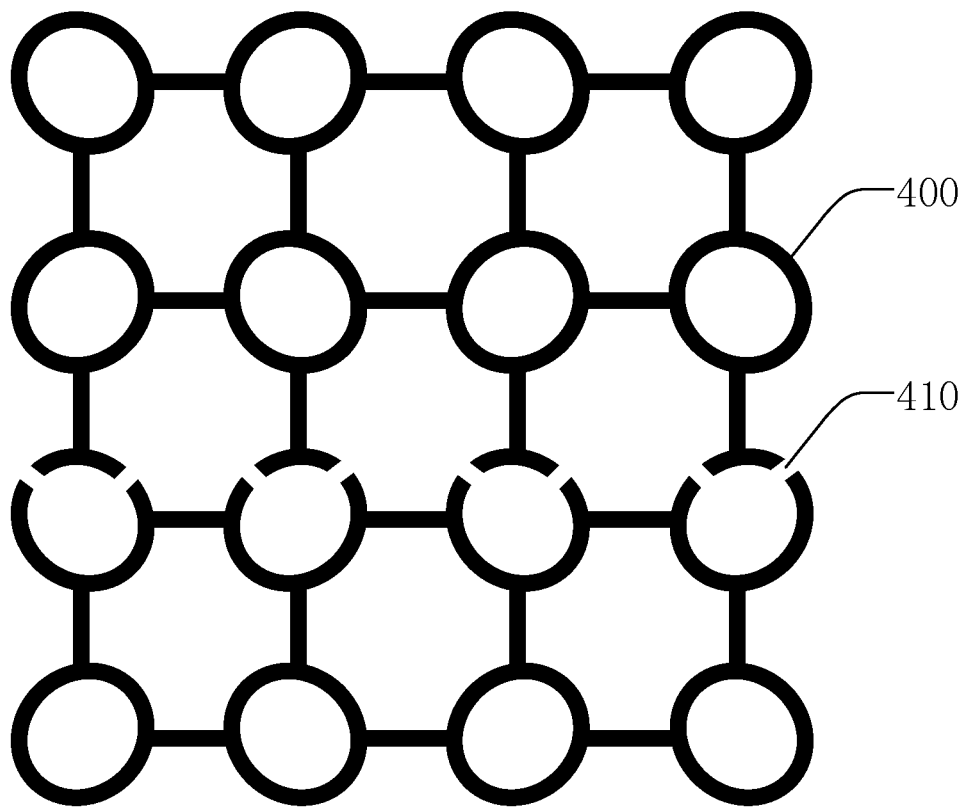
FIG. 9 is a planar schematic diagram of a metal mesh structure in one embodiment of the present invention.

Furthermore, a material of the first electrode 100, the second electrode 200, and the dummy electrode can be a metal material or a transparent conductive material, e.g., one of titanium, aluminum, molybdenum, silver, copper, indium tin oxide (ITO), or aluminum-doped zinc oxide (AZO). When the metal material is adopted, in order to prevent the touch substrate 1 from affecting light emission of the display panel, the first electrode 100, the second electrode 200 and the dummy electrode are all metal mesh structures. Furthermore, as illustrated in FIG. 8, an orthographic projection of metal lines 400 in the metal mesh structure on the display panel is located between two adjacent light-emitting devices 41. As illustrated in FIG. 9, fractures 410 are defined in the metal lines 400 in the metal mesh structure. Electrical insulation between the first electrode 100, the second electrode 200, and the dummy electrode can be maintained through the plurality of fractures 410. Meanwhile, by remaining the metal mesh structure in the dummy electrode, optical transmittance and reflectivity of each region can also ensure to be consistent, preventing display effect of the display panel from being affected due to different light-emitting rates.

Specifically, experiments were performed under a same power-on environment for a comparative example 1 (conventional touch unit) and the touch unit 15 provided in the embodiments of the present invention, and relevant data is obtained as illustrated in table 1.

TABLE 1

| | touch unit in comparative example 1 | touch unit in the embodiments of the present invention |
|---|---|---|
| parasitic capacitance during finger touch Cm(pf) | 0.74 | 0.479 |
| parasitic capacitance without finger touch Cm'(pf) | 0.69 | 0.418 |
| change amount of parasitic capacitance ΔCm(pf) | 0.05 | 0.061 |
| ration of change amount of parasitic capacitance to parasitic capacitance ΔCm/Cm | 6.76% | 12.73% |

TABLE 1-continued

| | touch unit in comparative example 1 | touch unit in the embodiments of the present invention |
|---|---|---|
| mutual capacitance of fingers to driving electrode C(finger-TX)(pf) | 0.25 | 0.239 |
| mutual capacitance of fingers to sensing electrode C(finger-RX)(pf) | 0.232 | 0.262 |
| self-capacitance of driving electrode (TX) to cathode, unit: Cb(pf) | 10.162 | 9.78 |
| self-capacitance of sensing electrode (RX) to cathode, unit: Cb(pf) | 9.395 | 10.785 |
| self-impedance of driving electrode (TX), unit: R(ohm) | 29.3 | 34.79 |
| self-impedance of sensing electrode (RX), unit: R(ohm) | 40.48 | 28.25 |

On the basis of the contents of table 1, it can be understood that: regarding the touch unit 15 provided in the embodiments of the present invention, when the finger does not touch the touch unit 15, the parasitic capacitance of the first electrode 100 and the second electrode 200 is 0.418 pf; when the finger touches the touch unit 15, the parasitic capacitance of the first electrode 100 and the second electrode 200 is 0.479 pf; i.e., the change amount of the parasitic capacitance of the first electrode 100 and the second electrode 200 is 0.061 pf. That is, a ratio of the change amount of the parasitic capacitance to the parasitic capacitance is 12.73%.

Regarding the touch unit in the comparative example 1, when the finger does not touch the touch unit, the parasitic capacitance of the driving electrode and the sensing electrode is 0.69 pf; when the finger touches the touch unit, the parasitic capacitance of the driving electrode and the sensing electrode is 0.74 pf; i.e., the change amount of the parasitic capacitance of the driving electrode and the sensing electrode of the comparative example 1 is 0.05 pf. That is, the ratio of parasitic capacitance variation to parasitic capacitance is 6.76%.

In summary, by adopting manner of configuring the touch units 15 illustrated in FIG. 2, compared to the touch control units in the comparative example 1, when a finger touches, the parasitic capacitance of the driving electrodes and the sensing electrodes can be reduced by 0.261 pf, and the change amount of the parasitic capacitance of the driving electrodes and the sensing electrodes can be reduced by 0.011 pf. Therefore, this solution can realize that the first electrode 100 and the second electrode 200 have smaller parasitic capacitance and larger change amount of the parasitic capacitance, so as to improve the ratio of the change amount of the parasitic capacitance to the parasitic capacitance, thereby improving the touch accuracy and the sensitivity of the touch substrate 1.

Figure 10:
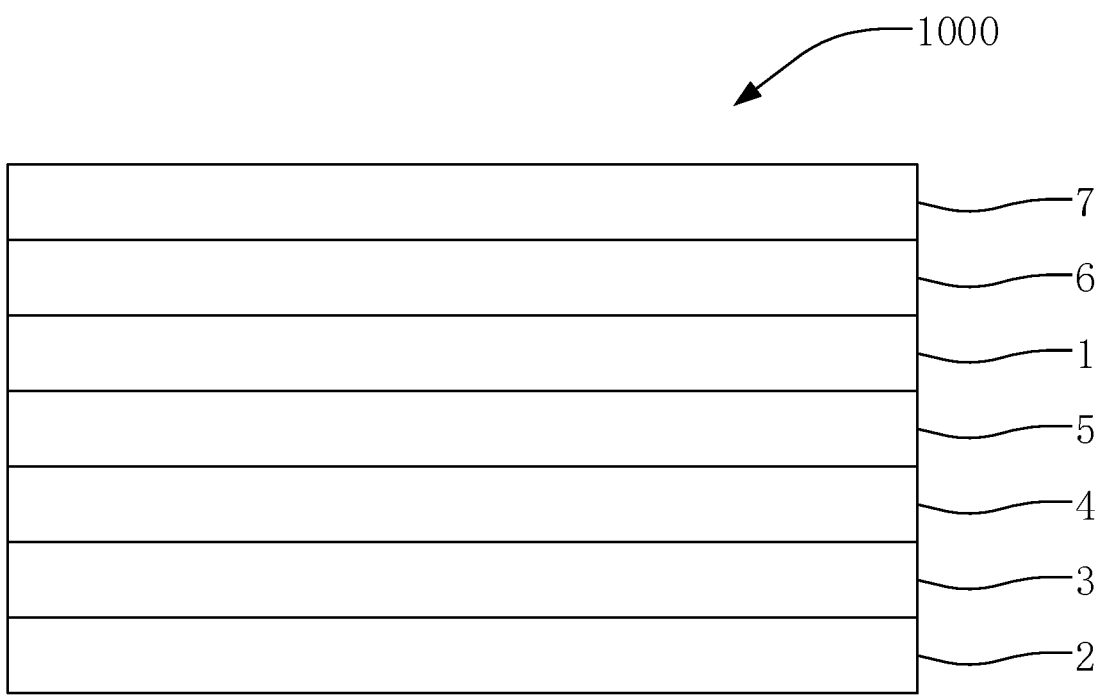
FIG. 10 is a structural schematic diagram of a layer structure of a display panel in one embodiment of the present invention.

One embodiment of the present invention further provides a display panel 1000, which can be one of different types of light-emitting display panels 1000, e.g., an organic light-emitting diode (OLED) display panel 1000, an active-matrix organic light-emitting diode (AMOLED) display panel 1000, a mini light-emitting diode (mini-LED) display panel 1000 or a micro light-emitting diode (micro-LED) display panel 1000. As illustrated in FIG. 10, the display panel 1000 includes a substrate layer 2, an array substrate 3, a light-emitting layer 4, a thin film encapsulation layer 5, a polarizer 6, a cover plate 7, and the aforesaid touch substrate 1. The substrate layer 2, the array substrate 3, the light-emitting layer 4, and the thin film encapsulation layer 5 are sequentially stacked. The touch substrate 1 is disposed on a surface of the thin film encapsulation layer 5 away from the light-emitting layer 4 The polarizer 6 and the cover plate 7 are sequentially stacked on a surface of the touch substrate 1 away from the thin film encapsulation layer 5. Wherein, the light-emitting device 41 is located in the light-emitting layer 4, and the light-emitting device 41 can be selected from light-emitting bodies such as OLEDs, mini-LEDs, or micro-LEDs according to requirements.

The embodiments of the present invention provide the touch substrate and the display panel. By the design of the branch circuits being distributed uniformly, and interlaced and enclosed with each other, the distribution of the mutual capacitance electric field in each touch unit is more uniform. Furthermore, the area that the first electrode and the second electrode facing to each other is increased in the limited space, thereby increasing change amount of the parasitic capacitance of the first electrode and the second electrode after touched and effectively reducing RC delay of the touch units, so that sensitivity and accuracy of the touch substrate during recognizing the touch position are improved.

Although the present invention is described above with reference to specific embodiments, but it should be noted that these embodiments are merely exemplary of the principles and applications of the present disclosure. Therefore, it should therefore be understood that the exemplary embodiments can be amended in various ways and other designs can also be provided without departure from the spirit and scope of the present disclosure. It should be understood that different features in the dependent claims and the description can be combined in ways different from those described in the original claims. It can also be understood that a combination of features in one embodiment can be used in other embodiments.

What is claimed is:

1. A touch substrate comprising: a plurality of touch units, at least one first branch pattern, at least one second branch pattern, at least one third branch pattern, and at least one fourth branch pattern, wherein each of the touch units comprises a first electrode and a second electrode disposed electrically insulated from each other, four regions arranged in an array manner are defined in each of the touch units, a first connection center and a second connection center correspond to two central points of adjacent two of the regions;

wherein the first electrode comprises:
a first main branch electrode extending along a first direction, and
the at least one first branch pattern and the at least one third branch pattern are respectively disposed on two sides of the first main branch electrode;

wherein the second electrode comprises:
a second main branch electrode extending along a second direction perpendicular to the first direction, and
the at least one second branch pattern and the at least one fourth branch electrode are respectively disposed on two sides of the second main branch electrode; and wherein in the second direction, with the first connection center acting as a central point, and the first branch pattern diffuses toward two sides of the first connection center; and with the second connection center acting as a central point, and the second branch pattern diffuses toward two sides of the second connection center;

in the first direction, with the second connection center acting as the central point, the third branch pattern diffuses toward two sides of the second connection center and encloses the second branch pattern; and with the first connection center acting as the central point, the fourth branch pattern diffuses toward two sides of the first connection center and encloses the first branch pattern.

2. The touch substrate as claimed in claim 1, wherein an area of the first electrode is equal to an area of the second electrode in one of the touch units.

3. The touch substrate as claimed in claim 1, wherein the first electrode comprises:
a first secondary branch electrode parallel to the second main branch electrode and is electrically connected to the first main branch electrode;
a first branch electrode disposed on a side of the first main branch electrode and the first secondary branch electrode; and
the second electrode comprises:
a second secondary branch electrode parallel to the first main branch electrode and electrically connected to the second main branch electrode;
a second branch electrode disposed on a side of the second main branch electrode and the second secondary branch electrode; and
wherein the touch units are centrosymmetric structures, and each of the touch units has a symmetrical center;
with the symmetrical center acting as a central point, the first main branch electrode, the first secondary branch electrode, and the first branch electrode form a pinwheel-shaped structure;
the symmetrical center acting as the central point, the second main branch electrode, the second secondary branch electrode, and the second branch electrode form a pinwheel-shaped structure; and
a direction the pinwheel-shaped structure in the first electrode is opposite to a direction of the pinwheel-shaped structure in the second electrode.

4. The touch substrate as claimed in claim 3, wherein the second secondary branch electrode is disposed on a side of the first main branch electrode away from the first connection center, and
the first secondary branch electrode is disposed on a side of the second main branch electrode close to the second connection center.

5. The touch substrate as claimed in claim 3, wherein the touch units have a first region, a second region, a third region, and a fourth region arranged in an array manner;
in the first direction, the first region is connected to the fourth region, and the second region is connected to the third region;
in the second region, the first region is connected to the second region, and the third region is connected to the fourth region; and
a common connection point of the first region, the second region, the third region, and the fourth region is the symmetrical center of the touch units; and
wherein both the first region and the fourth region have the first branch pattern and the fourth branch pattern, and both the second region and the third region have the second branch pattern and the third branch pattern.

6. The touch substrate as claimed in claim 3, wherein the first branch pattern comprises:
a plurality of the first branch electrodes connected to the first connection center;
the first secondary branch electrode disposed on a side of the first branch pattern away from the first main branch electrode and parallel to the first main branch electrode;
in the first branch pattern, the plurality of the first branch electrodes located on a side of the first connection center close to the first main branch electrode are electrically connected to the first main branch electrode, and the plurality of the first branch electrodes located on a side of the first connection center away from the first main branch electrode are electrically connected to the first secondary branch electrode;
the third branch pattern comprises:
a plurality of the first branch electrodes disposed on two sides of the second connection center and electrically insulated from the second connection center;
a plurality of first secondary branch electrodes respectively disposed on a side of the fourth branch pattern close to the second main branch electrode and a side of the fourth branch pattern away from the second main branch electrode, and parallel to the second main branch electrode;
a first connection electrode electrically connected to the first secondary branch electrodes and located on a side of the third branch pattern away from the first main branch electrode; and
in the third branch pattern, an end of the plurality of the first branch electrodes away from the second connection center is electrically connected to the first secondary branch electrode, and the first secondary branch electrode away from the second main branch electrode is electrically connected to the first main branch electrode.

7. The touch substrate as claimed in claim 6, wherein
in the first branch pattern, at least one opening is enclosed by the first branch electrode, the first main branch electrode, and the first secondary branch electrode;
in the third branch pattern, at least one opening is enclosed by the plurality of the first branch electrodes and the first secondary branch electrode;
first dummy electrodes are disposed in the openings the first opening and the third opening, and the first dummy electrodes are electrically insulated from the first electrode.

8. The touch substrate as claimed in claim 3, wherein the second branch pattern comprises:
a plurality of the second branch electrodes connected to the second connection center,
a plurality of the second secondary branch electrodes respectively disposed on a side of the second branch pattern close to the first main branch electrode and a side of the second branch pattern away from the first main branch electrode, and parallel to the first main branch electrode;
in the second branch pattern, an end of the plurality of the second branch electrodes away from the second connection center are electrically connected to the second secondary branch electrode, and the second secondary branch electrode close to the first main branch electrode is electrically connected to the second main branch electrode;
the fourth branch pattern comprises:
a plurality of the second branch electrodes disposed on two sides of the first connection center and electrically insulated from the first connection center;
the second secondary branch electrode disposed on a side of the fourth branch pattern away from the second main branch electrode and parallel to the second main branch electrode;
a second connection electrode electrically connected to the second main branch electrode and the second secondary branch, and located on a side of the first branch pattern away from the first main branch electrode; and in the fourth branch pattern, the plurality of the second branch electrodes located on a side of the first connection center close to the second main branch electrode are connected to the second main branch electrode, and the plurality of the second branch electrodes located on a side of the first connection center away from the second main branch electrode are electrically connected to the second secondary branch electrode.

9. The touch substrate as claimed in claim 8, wherein
in the second branch pattern, at least one opening is enclosed by the second branch and the second secondary branch electrode;
in the fourth branch pattern, at least one opening is enclosed by the second branch electrode, the second main branch electrode, and the second secondary branch electrode;
second dummy electrodes are disposed in the openings the second opening and the fourth opening, and the second dummy electrodes are electrically insulated from the second electrode.

10. The touch substrate as claimed in claim 3, wherein the second branch electrode is disposed on at least one side of the first branch electrode, a gap is between the first branch electrode and the second branch electrode, a third dummy electrode is disposed in the gap, and the third dummy electrode is electrically insulated from the first electrode and the second electrode.

11. The touch substrate as claimed in claim 3, wherein the touch substrate comprises:
 a plurality of first electrode groups arranged along the second direction and extending along the first direction, and
 a plurality of second electrode groups arranged along the first direction and extending along the second direction;
 the touch units are arranged in the touch substrate in an array manner;
 in the first direction, first electrodes in two adjacent touch units are electrically connected to each other, and a plurality of the first electrodes electrically connected to each other combine to form one of the first electrode groups; and
 in the second direction, second electrodes in two adjacent touch units are electrically connected to each other, and a plurality of the second electrodes electrically connected to each other combine to form one of the second electrode groups.

12. The touch substrate as claimed in claim 11, wherein
in the first electrode group, two adjacent first electrodes are connected to each other through the first connection portion, and the first electrodes on two sides of the first connection portion are center-symmetrical with the first connection portion acting as a central point;
in the second electrode group, two adjacent second electrodes are connected to each other through the second connection portion, and the second electrodes on two sides of the second connection portion are center-symmetrical with the second connection portion acting as a central point; and wherein an area of the first connection portion is less than an area of the second connection portion.

13. The touch substrate as claimed in claim 12, wherein
at least two of the first main branch electrodes and at least two of the first secondary branch electrodes are directly connected to the first connection portion, and form a cross-shaped structure, and
at least two of the second main branch electrodes and at least two of the second secondary branch electrodes are directly connected to the second connection portion, and form a cross-shaped structure.

14. The touch substrate as claimed in claim 12, wherein the touch units comprise:
 a fourth dummy electrode disposed on an edge of the touch units and located on a side of the third branch pattern and the fourth branch pattern away from the first branch pattern and the second branch pattern, and the fourth dummy electrode is electrically insulated from the first electrode and the second electrode.

15. The touch substrate as claimed in claim 14, wherein
in each of the touch units, one first connection portion or one second connection portion is between two adjacent fourth dummy electrodes, an end of the fourth dummy electrode has the first connect position, and another end of the fourth dummy electrode has the second connect position;
in four touch units arranged in the array manner, four fourth dummy electrodes between two adjacent first connection portions or two adjacent second connection portions are connected to each other and form a radial structure.

16. The touch substrate as claimed in claim 1, wherein the first main branch electrode comprises two first main branch sub-electrodes, the main branch sub-electrodes are respectively located on two sides of the second main branch electrode and are bridged through at least one conductive bridge.

17. The touch substrate as claimed in claim 16, wherein the conductive bridge comprises a first connection segment and a second connection segment that are connected perpendicularly, and a length of the second connection segment is less than a length of the first connection segment.

18. The touch substrate as claimed in claim 1, wherein a minimum value of widths of branch electrodes in the first electrode and the second electrode is greater than a size of two sub-pixels.

19. The touch substrate as claimed in claim 1, wherein first electrode and the second electrode are composed of metal meshes or a transparent conductive material.

20. A display panel, comprising the touch substrate as claimed in claim 1.

* * * * *